UNITED STATES PATENT OFFICE.

RAPHAEL JOSIA, OF FLORENCE, ITALY, ASSIGNOR TO WILLIAM REY AND C. DE VARIGNY, BOTH OF PARIS, FRANCE.

COMPOSITION FOR TREATING SULPHATES OF LIME FOR THE MANUFACTURE OF ARTIFICIAL MARBLE.

SPECIFICATION forming part of Letters Patent No. 265,502, dated October 3, 1882.

Application filed August 9, 1882. (No specimens.)

*To all whom it may concern:*

Be it known that I, RAPHAEL JOSIA, of Florence, Kingdom of Italy, have invented or discovered a new and useful Improvement in Compositions for Treating Sulphates of Lime for the Manufacture of Artificial Marble; and I do hereby declare the following to be a full, clear, concise, and exact description thereof.

In an application for Letters Patent of the United States filed March 2, 1882, I have described and made claim to an improved process of treating or preparing gypsum (calcic sulphate or sulphate of lime) in the making of articles of a material which I have termed "certaldite" without pulverization of the gypsum. In said application I described briefly certain of the compounds or compositions which I employ to produce certain effects and the manner of using them, but stated that separate applications would be made for patents for such compositions.

The present application relates to one of the compositions so referred to, and it is designed for use in the process herein described in the making of black certaldite, though by varying the proportion of the coloring ingredients employed the shade or tint of color may be varied from the various shades of gray to deep black.

In carrying out the process referred to a suitable piece of gypsum (calcic sulphate) is first formed into the desired shape, or approximately such, by the use of suitable well-known tools. The gypsum employed may be the ordinary native gypsum of commerce, though I prefer that which is comparatively pure or free from other matters of different composition. Such gypsum is usually obtained hydrated, or containing a certain percentage of water in its composition; and the second step in the operation has reference to depriving the gypsum under treatment of a considerable part or the whole of such water. This is done by subjecting it to the action of a gradually-increasing heat, varying by preference with the size and quality of the material, from 260° to 300° Fahrenheit, for about twelve hours, or until the desired partial or complete dehydration is obtained. The length of time as well as the degree of heat required to effect this result will vary somewhat with the size, character, and purity of the gypsum employed; but the temperature should not exceed 500° Fahrenheit, and both it and the time of exposure should be regulated and limited with reference to securing uniformity of treatment throughout the whole mass or body. The operation may be known to be complete when a fracture of a test block presents a uniform white color. Any suitable drying or baking apparatus may be employed for this purpose, many such being known in kindred branches of the art; but it should be of such construction that the material under treatment shall not be brought into direct contact with the fire. When the desired dehydration has been effected the furnace is allowed to cool gradually, in order that the material under treatment may be cooled gradually; or the material may be removed with due care to prevent breaking and exposure to moisture, and allowed to cool outside the furnace gradually until it is reduced in temperature sufficiently to permit handling with safety in its subsequent treatment, which is designed to impart to it the desired color or tint and a high degree of insolubility and hardness throughout its mass. This step involves the use of the composition which forms the subject-matter of invention in the present application. This composition is formed of the following ingredients, and when designed for forming black or practically black certaldite they are employed in substantially the proportions named, as follows: water, by weight, two hundred parts; sulphate of iron, by weight, three parts; sulphate of copper, by weight, five-tenths part; Campeachy wood, by weight, three parts; gall-nuts, by weight, six parts; logwood, by weight, five-tenths part. These ingredients, being mixed in about the proportions named, form a solution which is used as a bath, and to this end a suitable quantity of it is placed in a vessel of proper shape to receive the article to be treated, which is dipped or immersed in the bath and subjected to its action until the article has acquired the desired degree of hardness and of color. The length of time required to effect this result will depend somewhat on the strength of the ingredients composing the bath or solution, the porosity and nature or physical and chemical condition of the article; but usually twelve hours (more or less) will suffice, though to secure uniformity of treatment and of result through the whole body or mass of the article I prefer repeated dippings—two, three, or more—say two or three seconds at first, and increasing gradually to one, two, three, or more minutes, more or less, with drying intervals of like increasing length between dippings, for half or three-quarters of an hour or so, after which the article may remain in the bath for twelve hours or so.

While I do not limit my invention by any particular theory of chemical or physical reaction involved in the use of this bath as above described, I believe, with my present knowledge, that the sulphate of iron held in solution by taking the place of the molecules of water displaced by the previous dehydrating operation acts chemically or physically upon the calcic sulphate, and renders it more compact, harder, and less soluble, and that it also aids in the hardening of the carbonates, which may be present in the gypsum as impurities, as well as in coloring, by forming with one or more of the other ingredients the tannate of iron. The other ingredients of which the bath is composed act principally either by chemical reaction, or physically, or both, as coloring agents. But whatever may be the correct theory of the action of this bath, I have found that it imparts to the dehydrated gypsum a high degree of hardness, density, susceptibility of high polish, insolubility, &c., together with a color or tint ranging from a deep black, when the ingredients are employed in about the proportions named, through the lighter shades of black and gray, the latter shades and tints being secured by varying the proportions of the coloring elements of the bath as may be desired.

When the article has been treated in the bath as above described it is removed and dried by exposure to the sun or to an equivalent furnace-heat for one or two hours, or by ordinary atmospheric exposure for two or three days, when it is ready for polishing and such other manipulation as may best fit it for its intended use, which may be done by any of the methods practiced in kindred arts.

No claim is made herein to the process herein set forth, as that, with various modifications of the same, as circumstances may require, forms the subject-matter of the first application herein referred to. Neither do I limit my present invention to the particular way herein described of applying it, though I now believe this way or process to be the best. I also believe the proportions of ingredients which I have named in forming my improved composition to be the best for the purposes stated, and, among others, to secure a uniform degree of hardness and color throughout the mass of the article. If the solution be very strong, there is great danger of rendering the surface of the article hard very quickly, and thereby preventing proper action of the bath upon the interior substance of the article; or if the solution be very weak too much time is required, and even then a proper degree of hardness, density, and insolubility is not secured; also, by the conjoint action of all the elements of the bath much better results are secured, especially upon native gypsum, than by a solution formed of a part of the elements. For these reasons I prefer to employ all the elements of the composition in substantially the proportions named; but such limits, though the best, may be varied somewhat and still attain good results under skillful manipulation; and all such modifications which are composed of the elements and of about the proportions described and operate as herein described I consider as coming within my present invention and the claim herein made.

I claim as my invention—

The composition herein described for treating dehydrated gypsum, consisting substantially of the following elements: water, sulphate of iron, sulphate of copper, Campeachy wood, gall-nuts, and logwood, in about the proportions specified.

In testimony whereof I have hereunto set my hand.

RAPHAEL JOSIA.

Witnesses:
GUIDO PANTALIONY,
R. H. WHITTLESEY.